US012784524B2

(12) United States Patent
Wigenstam

(10) Patent No.: US 12,784,524 B2
(45) Date of Patent: Nov. 3, 2026

(54) COIN BRIDGE COUNTERACTION IN A COIN HANDLING DEVICE

(71) Applicant: Scan Coin AB, Malmö (SE)

(72) Inventor: Dan Wigenstam, Eslöv (SE)

(73) Assignee: Scan Coin AB, Malmö (SE)

( * ) Notice: Subject to any disclaimer, the term of this patent is extended or adjusted under 35 U.S.C. 154(b) by 542 days.

(21) Appl. No.: 18/264,974

(22) PCT Filed: Mar. 7, 2022

(86) PCT No.: PCT/EP2022/055664

§ 371 (c)(1),
(2) Date: Aug. 10, 2023

(87) PCT Pub. No.: WO2022/189320

PCT Pub. Date: Sep. 15, 2022

(65) Prior Publication Data

US 2024/0054842 A1 Feb. 15, 2024

(30) Foreign Application Priority Data

Mar. 8, 2021 (EP) .................................... 21161214

(51) Int. Cl.
*G07D 9/00* (2006.01)

(52) U.S. Cl.
CPC .................................... *G07D 9/008* (2013.01)

(58) Field of Classification Search
CPC ............ G07D 9/008; G07D 1/00; G07D 1/02; G07D 1/04; G07D 1/06; G07D 1/08;
(Continued)

(56) References Cited

U.S. PATENT DOCUMENTS 2,234,343 A * 3/1941 Harrington ........... E01C 19/203 239/685
2,535,414 A * 12/1950 Heidger ................ E01C 19/203 222/242

(Continued)

FOREIGN PATENT DOCUMENTS

| | | | |
|---|---|---|---|
| JP | S5346191 U | | 4/1978 |
| JP | H087142 A | | 1/1996 |
| JP | H0935107 A | | 2/1997 |

*Primary Examiner* — Jeffrey A Shapiro
(74) *Attorney, Agent, or Firm* — Capitol City TechLaw

(57) ABSTRACT

A coin handling device for a coin handling machine may include a coin container for holding coins in a volume. A coin output arrangement may be configured to output coins from the coin container. The coin handling device may include a bridge-counteracting arrangement for counteracting coin bridge formation. The bridge-counteracting arrangement may include a center shaft protruding into the volume and configured to perform rotational motion. A bridge-breaking, element presenting a coin interacting surface may be arranged in the volume, facing away from the bottom of the volume, and extending externally to a perimeter of the center shaft, towards an inner wall defining the volume. The center shaft may have a distal end coupled to the bridge-breaking element for enabling conversion of rotational motion of the center shaft to wiggling motion of the coin interacting surface, whereby coin bridge formation is counteracted.

14 Claims, 7 Drawing Sheets

(58) Field of Classification Search

CPC .. G07D 3/00; G07D 3/02; G07D 3/06; G07D 3/08; G07D 3/128; G07D 9/06; G07D 13/00; G07D 2201/00

USPC .............. 453/5, 6, 10, 12, 13, 33–35, 49, 57

See application file for complete search history.

(56) References Cited

U.S. PATENT DOCUMENTS 4,810,230 A * 3/1989 Shirasawa .............. G07D 9/008 453/57
4,822,318 A * 4/1989 Okada .................... G07D 9/008 453/57
5,067,928 A * 11/1991 Harris ...................... G07D 9/00 453/18
5,176,290 A * 1/1993 Schwarzli ............... G07F 11/44 221/265
5,695,395 A * 12/1997 Ota ........................ G07D 9/008 453/57
6,569,006 B1 * 5/2003 Kurosawa .............. G07D 9/008 453/57
6,602,125 B2 * 8/2003 Martin ..................... G07D 3/16 453/57
7,175,046 B2 * 2/2007 Yao ......................... G07F 11/44 221/265
11,380,154 B2 * 7/2022 Yamamiya ............... G07D 1/00
2002/0061725 A1 * 5/2002 Kurosawa .............. G07D 9/008 453/57
2002/0072319 A1 * 6/2002 Abe ....................... G07D 9/008 453/49
2002/0090906 A1 * 7/2002 Abe ....................... G07D 9/008 453/57
2003/0148729 A1 * 8/2003 Abe ......................... G07D 1/02 453/57
2004/0072528 A1 * 4/2004 Kurosawa .............. G07D 9/008 453/33
2008/0082207 A1 * 4/2008 Sjostrom .................. G07D 9/02 700/231
2015/0213665 A1 * 7/2015 Umeda .................. G07D 3/128 453/57
2015/0294520 A1 * 10/2015 Cohrs ...................... G07D 9/00 453/57
2020/0265666 A1 * 8/2020 Yamamiya ............. G07D 9/008

* cited by examiner

COIN BRIDGE COUNTERACTION IN A COIN HANDLING DEVICE

This application claims priority under 35 USC 119 (a)-(d) from EP patent application No. 21161214.8 filed on Mar. 8, 2021, the entire contents of which are incorporated herein by reference.

TECHNICAL FIELD

The present inventive concept relates to a coin handling device for a coin handling machine and a method for counteraction of coin bridge formation in a coin handling device.

BACKGROUND

Coin handling machines are useful whenever there is a need for handling, such as e.g. sorting and/or counting and/or dispensing, large quantities of coins. Such machines can for example receive a number of mixed coins which are to be counted and/or sorted based on parameters such as size and denomination. Some coin handling machines comprise a coin handling device configured to receive a mass of coins input thereto in a coin container or a coin hopper for selectively transporting or dispensing the received coins from the coin handling device when needed. One kind of such a coin handling device is a coin feeding device intended to receive a great number of coins, and to feed those coins one after another to a coin sorting device. Another kind of such a coin handling device is a coin dispenser, which is configured to hold a mass of coins of a particular denomination and selectively dispense coins from the coin dispenser when needed. Both these kinds of coin handling devices comprise a mechanism for outputting or transporting coins from the device, a mechanism that often includes a rotating disk or a conveyor belt.

When handling these large quantities of coins however, there is a risk that coin bridges will form between inner structures within the coin handling device. Such coin bridges may prevent coins from being outputted from the coin handling machines even though coins are present in the coin handling machine. This can disrupt the working operation of the apparatus. Such disruption causes a reduction of efficiency, and/or jeopardizes accuracy by increasing a risk of a miscount.

In order to maintain a sufficiently high accuracy and reliability of the coin handling devices, it is thus desirable to provide an improved way of avoiding formation of coin bridges.

SUMMARY

An objective of the present inventive concept is to mitigate, alleviate or eliminate one or more of the above-identified deficiencies in the art and disadvantages singly or in any combination.

These and other objectives are at least partly met by the invention as defined in the independent claims. Preferred embodiments are set out in the dependent claims.

According to a first aspect, there is provided a coin handling device for a coin handling machine, the coin handling device comprising:

a coin container configured to define a volume and to hold a mass of coins input to the coin container in the volume, a coin output arrangement arranged at a lower end of the coin container, said coin output arrangement being configured to output one or more coins of the mass of coins from the coin container at a bottom of the volume, wherein the coin handling device is configured to be arranged in an orientation for use such that coins will be pulled towards the bottom of the volume by the gravitational field;

wherein the coin handling device further comprises a bridge-counteracting arrangement configured to counteract coin bridge formation in the volume, the bridge-counteracting arrangement comprising a center shaft protruding from the bottom of the volume into the volume, the center shaft being configured to perform a rotational motion around a rotational axis of the center shaft, and a bridge-breaking element presenting a coin interacting surface arranged in the volume and facing away from the bottom of the volume, wherein the coin interacting surface extends externally to a perimeter of the center shaft, towards an inner wall defining the volume;

wherein the center shaft comprises a distal end with respect to the bottom of the volume, which distal end is coupled to the bridge-breaking element for enabling conversion of the rotational motion of the center shaft to a wiggling motion of the coin interacting surface, whereby coin bridge formation is counteracted.

The coin handling device is a coin dispenser configured to dispense coins of the mass of coins individually from the coin container. This kind of coin output arrangements are commonly used for coin dispensers which are arranged inside coin handling machines such as coin depositing and dispensing machines used at banks and large financial institutions. However, coin dispensers may also be used in coin handling apparatuses intended for use at a point of sale.

The coin handling device is not limited to a particular mechanism for picking up and transporting coins to a coin output. Rather, such a mechanism may be any one of a number of different mechanisms. Given as non-limiting examples, the mechanism for outputting coins from the coin handling device may comprise a rotatable disk, a conveyor belt, or any other suitable output mechanism.

By the term "coin container" is here meant any hollow body that is adapted to receive and hold a mass of coins. By way of example, the coin container may be, but is not limited to, a bowl or a hopper.

It should be understood that the volume may be defined solely by the coin container, or alternatively the volume may be defined by the coin container in combination with one or more other features. By way of example, the volume may be defined by the coin container and the coin output arrangement in combination. Given as a non-limiting example, the coin output arrangement may comprise inner walls at an upper part of the coin output arrangement, the inner walls connecting to inner walls of the coin container such that the inner walls of the coin container and the inner walls of the coin output arrangement together define the volume.

The coin handling device is configured to be arranged in an orientation for use such that coins will be pulled towards the bottom of the volume by the gravitational field. It should be understood that the center shaft protruding from the bottom of the volume, into the volume, may preferably have, but is by no means limited to having, a direction substantially along a line of force of the gravitational field, when the coin handling device is arranged in the orientation for use.

It should be understood that the rotational axis of the center shaft may coincide with the direction of extension of the center shaft. In other words, the rotational axis of the enter shaft may coincide with the geometrical axis of symmetry of the center shaft. However, the rotational axis is not limited to coincide with the direction of extension of the center shaft. It is conceivable that the center shaft may alternatively be arranged externally to the rotational axis with the rotational axis being parallel to the direction of extension of the center shaft. As another alternative, the center shaft may be arranged such that the direction of extension of the center shaft may form an angle with respect to the rotational axis of the center shaft, and such that the center shaft may intersect with the rotational axis at one point.

By the term "bridge-breaking element" is here meant any unit or element structured and arranged to interact with the coins by physical contact, such that coin bridge formation is counteracted. The bridge-breaking element may be made of a solid, rigid material, such as a metal or plastic material. The coin interacting surface of the bridge-braking element faces away from the bottom of the volume. Thus, if a mass of coins is present in the volume to reach a level from the bottom of the volume to above the coin interacting surface, the coin interacting surface is facing some of the coins in the mass of coins.

By the expression "the coin interacting surface extends externally to a perimeter of the center shaft" is here meant that the coin interacting surface radially extends outside of a lateral surface of the center shaft. The coin interacting surface extends towards, but not all the way to, an inner wall defining the volume. In other words, the bridge-breaking element is arranged in the volume such that there is no physical contact between the coin interacting surface and the inner wall. The bridge-counteracting arrangement is arranged so as to leave enough space between the wall and the coin interacting surface that coins can pass through the gap as the coins advance towards the bottom of the volume.

By way of example, the bridge-breaking element may have the shape of a cone or a cone with a rounded top, wherein the coin interacting surface may be the lateral surface of the cone. The shape of the bridge-breaking element is however not limited to a cone, but may alternatively have the shape of a prism, a planar sheet, or any other suitable shape. Further, the bridge-breaking element is not limited to having a circular cross-section, but may alternatively have a cross-section in the shape of an ellipse, a triangle, a rectangle, a pentagon, a hexagon, a trapezoid, or any other suitable shape. Further yet, the bridge-breaking element is not limited to having a symmetrically shaped cross-section.

By the term "rotational motion" is here meant a motion during which every point on a moving rigid body moves in a circle about a single rotational axis. Thus, the radius from the rotational axis to every point on the moving object undergo the same angular displacement simultaneously. This should be seen in contrast to purely "translational motion" by which is here meant a motion during which all points on the moving rigid object have the same instantaneous velocity. It should be noted that a rigid body moving along a circular path without changing its orientation undergoes a purely translational motion.

By the term "wiggling motion" is here meant short movements going back and forth. By way of example, a wiggling motion may be a rocking motion, an oscillating motion, or a motion following a closed path such as following a circular path. A wiggling motion need not be an isolated wiggling motion, but may be overlayed on a translational motion, a rotational motion, or a combination thereof. Further, a wiggling motion may occur in one direction or plane, whereas another motion may occur simultaneously in other directions or planes.

By a "conversion" of the rotational motion of the center shaft to a wiggling motion of the coin interacting surface is here meant that the rotational motion is converted to a different type of motion, i.e., the wiggling motion of the coin interaction surface is a different motion from the rotational motion of the center shaft. With the above-mentioned definition of a rotational motion, the center shaft undergoes a rotational motion if every point on the center shaft undergoes the same angular displacement simultaneously with respect to the rotational axis of the center shaft. Thus, a "conversion" to a wiggling motion of the coin interaction surface means that at least some points on the coin interacting surface undergo a different angular displacement with respect to the rotational axis of the center shaft than the angular displacement of the points on the center shaft. Further, the wiggling motion may be such that not all points on the coin interacting surface undergo the same angular displacement with respect to the rotational axis of the center shaft.

By the expression "the distal end is coupled to the bridge-breaking element for enabling conversion of the rotational motion of the center shaft to a wiggling motion of the coin interacting surface" is here meant that the bridge-breaking element is coupled to the rotational motion of the center shaft such that it does not necessarily follow the motion of the center shaft. The bridge-breaking element may be arranged such that when a mass of coins is resting on the coin interacting surface, a friction is caused by the coins on the coin interacting surface such that the bridge-breaking element will not rotate with the center shaft. Instead, the bridge-breaking element is arranged with respect to the center shaft such that the rotational motion of the center shaft is converted to a wiggling motion of the bridge-breaking element, and thus of the coin interacting surface. However, when no mass of coins is resting on the coin interacting surface, the bridge-breaking element may rotate with the center shaft. According to an alternative, the center shaft may be coupled to the bridge-breaking element such that the rotational motion of the center shaft is always converted to a wiggling motion of the coin interacting surface.

An advantage of having a bridge-counteracting arrangement according to the present disclosure is that coin bridge formation may be counteracted. The typical shape of coins makes them prone to accumulate in a certain way with respect to each other. This may result in the adverse effect of coin bridge formations, wherein several coins end up in positions in which they together form a bridge of coins extending between stationary surfaces in the volume e.g. between inner walls of the coin container. Coin bridge formation may result in jam in the operation as coins are prevented from being dispensed or transported from the coin handling device. The bridge-counteracting arrangement of the present disclosure may interact with coins in the volume, counteracting the formation of coin bridges and/or breaking up coin bridges, thereby preventing coin jams caused by coin bridge formation.

By the present arrangement, interruptions in the operation of the coin handling machine may be avoided. In the manner described above, a coin handling machine that does not require frequent supervision and/or interference by trained personnel may be provided. Thus, the machine becomes more reliable, efficient, and cheaper to operate.

Another advantage with having a bridge-counteracting arrangement according to the present disclosure is that other parts of the coin output arrangement may be relieved of some of the weight load from the mass of coins in the volume. With a large mass of coins, the weight load on other parts of the coin output arrangement arranged at the bottom of the volume, e.g. a rotatable disk, may be considerable if the full mass of coins rests thereon, and may thereby jeopardize the function and/or reliability of the coin output arrangement. With the bridge-counteracting arrangement disclosed herein, the coin interacting surface may additionally function as a shield on which part of the mass of coins may rest, consequently lowering the weight load on parts of the coin output arrangement.

According to an embodiment, at least a portion of the coin interacting surface has an inclination with respect to a plane to which the rotational axis of the center shaft extends perpendicularly, from the distal end towards the bottom of the volume.

It should be understood that when the coin handling device is arranged in the orientation for use, the plane to which the rotational axis of the center shaft extends perpendicularly may have a substantially horizontal orientation. In other words, the plane is arranged substantially perpendicular to Earth's gravitational field.

An advantage with this embodiment is that the portion of the coin interacting surface having an inclination with respect to the plane, and thus being non-parallel to the plane, is thereby also non-perpendicular to the gravitational field. As such, the portion of the coin interacting surface does not constitute a horizontal shelf onto which coins may rest, but rather a slope off of which coins may slide, as they are being pulled by the gravitational field. Moreover, since the portion of the coin interacting surface has an inclination from the distal end of the central shaft towards the bottom of the volume, a coin handling device with a reduced risk for coins getting stuck by resting on horizontal surfaces in the volume, may be provided.

According to an embodiment, an inclination angle between the portion of the coin interacting surface and the plane is within the interval of 10° to 70°, and preferably within the interval of 15° to 50°.

The inclination angle in the interval as mentioned above may be particularly advantageous for causing coins to slide off of the coin interacting surface, as the coin interacting surface is performing a wiggling motion.

According to an embodiment, the wiggling motion comprises a movement of at least some points on the coin interacting surface, in a direction parallel to the rotational axis of the center shaft, alternatingly towards and away from the bottom of the volume, during the course of rotational motion of the center shaft.

As previously mentioned, when in orientation for use, the center shaft may be arranged substantially parallel to Earth's gravitational field. A wiggling motion alternatingly towards and away from the bottom of the volume is thus an upward and downward motion in the gravitational field. By way of example, the wiggling motion may be an isolated upwards and downward motion, or it may alternatively be an upward and downward motion overlayed on another motion such as a translational motion, a rotational motion, or a combination thereof.

An advantage with this embodiment is that by the wiggling motion described above the coin interacting surface may interact with the coins in the volume in such a way that coin bridge formation may efficiently be counteracted.

According to an embodiment, the wiggling motion comprises, for at least some points on the coin interacting surface, movement with alternating directions perpendicular to the rotational axis of the center shaft, during the course of rotational motion of the center shaft.

A wiggling motion with alternating directions perpendicular to the rotational axis of the center shaft may thus, when in orientation for use, be a side-to-side motion in the gravitational field. By way of example, the wiggling motion may be an isolated side-to-side motion, or it may alternatively be a side-to-side motion overlayed on another motion such as a translational motion, a rotational motion, or a combination thereof.

An advantage with this embodiment is that by the wiggling motion described above the coin interacting surface may interact with the coins in the volume in such a way that coin bridge formation may efficiently be counteracted.

According to an embodiment, the wiggling motion comprises a movement of at least some points on the coin interacting surface, in a direction parallel to the rotational axis of the center shaft, alternatingly towards and away from the bottom of the volume, during the course of rotational motion of the center shaft or the wiggling motion comprises a movement of at least some points on the coin interacting surface, in a direction parallel to the rotational axis of the center shaft, alternatingly towards and away from the bottom of the volume, during the course of rotational motion of the center shaft. According to another embodiment, a wiggling motion may comprise a combination of the above movements.

According to an embodiment, the coin output arrangement further comprises a rotatable disk located at the bottom of the volume, wherein the rotatable disk includes one or more coin engaging elements defined on the rotatable disk on a coin facing surface thereof, each of the one or more coin engaging elements being configured to engage an individual coin of the mass of coins to allow said individual coin to be output from the coin container.

Each of the one or more coin engaging elements may be defined by walls surrounding a through-opening or an indentation formed in the rotatable disk for allowing the individual coin to be carried by the coin engaging element for being output from the coin container. The coin output arrangement may be configured to receive the individual coin in the through-opening or indentation of the rotatable disk such that the individual coin is residing inside the through-opening extending with its flat side in the plane defined by the rotatable disk. The coin output arrangement may be configured to output the coin through the rotatable disk via the through-opening or in a lateral direction from the through-opening or the indentation along a plane defined by the rotatable disk.

The through-openings or indentations may define a circular shape having a diameter corresponding to the diameter of the individual coin such that the rotatable disk, when in use, will be able to move the individual coin with the rotatable disk along a circular path within the plane of the rotatable disk. If the rotatable disk comprises through-openings, the individual coin may be supported by the one or more further structural elements from below. The coin output arrangement may be configured to dispense the individual coin from a position located along the circular path, to output the individual coin through the through-opening from the coin handling device or to push the individual coin laterally out of the through-opening or indentation.

An advantage with this embodiment is that rotatable disks are commonly used and well-established mechanisms for outputting coins. Further, mechanisms based on rotatable disk may be more compact than alternative mechanisms, which is an advantage especially for use in coin handling machined comprising several coin handling devices.

According to an embodiment, the center shaft is protruding in a direction perpendicular to the coin facing surface, into the volume, such that the rotational axis of the center shaft coincides with a rotational axis of the rotatable disk.

The center shaft of the bridge-counteracting arrangement is arranged such that the rotational axis of the center shaft coincides with the rotational axis of rotatable disk. It should be understood that such an arrangement may be achieved in a number of different ways. Given as a non-limiting example, the center shaft may be fixedly arranged in a center of the rotatable disk on the coin facing surface, such that the center shaft follows the rotation of the rotatable disk. Given as another non-limiting example, the center shaft may be arranged through a through-hole in the center of the rotatable disk such that the center shaft may freely rotate in the through-hole. In this manner, the center shaft may be rotated independently of the rotatable disk.

It should be understood that for embodiments in which the center shaft is arranged to protrude in a direction substantially along a line of force of the gravitational field, when the coin handling device is arranged in the orientation for use, the rotatable disk is consequently arranged in a horizontal plane.

It serves to mention that in alternative embodiments the coin handling device may comprise a rotatable disk that is not horizontally arranged when the coin handling device is in the orientation for use.

According to an embodiment, the center shaft is operably coupled to the rotatable disk, linking the rotational motion of the center shaft to the rotational motion of the rotatable disk.

Given as a non-limiting example, the center shaft may be fixedly arranged in a center of the rotatable disk on the coin facing surface, such that the rotation of the center shaft is linked to the rotation of the rotatable disk. In this manner, the center shaft may follow the same angular velocity as the rotatable disk.

Given as another non-limiting example, the center shaft may be coupled via gear to the rotatable disk, such that the rotation of the center shaft is linked to the rotation of the rotatable disk. In this manner, the center shaft may follow a different angular velocity than the rotatable disk.

An advantage with this embodiment is that it may be easily implemented. Fixation of a central shaft on the rotatable disk is easily accomplished, and the technology for gear coupling to achieve different angular velocities is also well known.

Another advantage with this embodiment is that it may require only a single rotation generating unit, such as a driving motor, for driving the rotation of the rotatable disk and the center shaft. By the present arrangement, a coin handling device comprising a compact bridge-counteracting arrangement may be provided at a relatively low cost.

According to an embodiment, the rotatable disk is coupled to a first rotation generating unit and the center shaft is coupled to a second rotation generating unit, such that the rotational motion of the rotatable disk and the rotational motion of the center shaft are independent of each other.

Given as non-limiting example, the center shaft may be arranged through a through-hole in the center of the rotatable disk such that the center shaft may freely rotate in the through-hole. In this manner, the center shaft may be rotated independently of the rotatable disk. Further, the center shaft may optionally be set to follow a different angular velocity than the rotatable disk, or to follow the same angular velocity as the rotatable disk. Further yet, optionally the center shaft may be set to rotate while the rotatable disk is stopped, and vice versa.

An advantage with this embodiment is that a more flexible coin handling device may be provided. In the manner described above, the bridge-counteracting arrangement may optionally be run at all times, or only when required. By way of example, if required the bridge-counteracting arrangement may be run even when the rotatable disk is stopped.

According to an embodiment, the distal end is coupled to the bridge-breaking element such that rotational motion of the center shaft does not force rotational motion of the bridge-breaking element.

A wiggling motion of the bridge-breaking element involves a relatively small travel distance for each point on the coin interacting surface. Hence, only moderate power is required to drive such a wiggling movement through a mass of coins. However, if the bridge-breaking element is forced to rotate along with the center shaft some points on the coin interacting surface may need to travel significantly larger distances through the mass of coins. This may be compared to stirring through the mass of coins. With a large mass of coins present in the volume, the power required to drive such a rotational motion may be considerably larger than the power required to drive the wiggling motion, due to the weight load on the bridge-breaking element.

An advantage with the embodiment of the rotational motion of the center shaft not forcing rotational motion of also the bridge-breaking element is that the wiggling motion for the bridge-counteracting arrangement may be transmitted with only moderate power. In this manner, less electrical power is required for driving the bridge-counteracting arrangement. Further, less force is consequently exerted on the parts of the bridge-counteracting arrangement, which may prolong the lifetime of the parts. By the present arrangement, a coin handling device comprising a durable bridge-counteracting arrangement may be provided.

According to an embodiment, a coupling between the distal end and the bridge-breaking element comprises at least one set of bearings.

By way of example, the at least one set of bearings may be ball bearings or cylinder bearings or any other suitable type of bearings.

An advantage with this embodiment is that it is an easy yet efficient way of providing a coupling between the distal end of the center shaft and the bridge-breaking element that allows independent rotation of the parts. The use of bearings is well established, and standard components may be used for achieving the coupling. In the present manner, coupling between the distal end of the center shaft and the bridge-breaking element may be easily and efficiently provided, such that the rotational motion of the center shaft does not force rotational motion of the bridge-breaking element.

According to an embodiment, the bridge-counteracting arrangement further comprises a tilt shaft comprising a first end and a second end, wherein the first end of the tilt shaft is fixedly coupled to the distal end of the center shaft such that the tilt shaft forms a tilt angle with respect to the rotational axis of the center shaft, and wherein the second end of the tilt shaft is rotatably coupled to the bridge-breaking element.

By the present arrangement, a wiggling motion may be achieved for at least some points on the coin interacting surface, comprising a movement in a direction parallel to the rotational axis of the center shaft, alternatingly towards and away from the bottom of the volume, during the course of rotational motion of the center shaft.

It should be noted that the rotational motion of the center shaft is transferred to the tilt shaft. However, since the tilt shaft is "rotatably coupled" to the bridge-breaking element, the rotational motion may be converted into a wiggling motion of the bridge-breaking element.

An advantage with this embodiment is that a bridge-counteracting arrangement that may be easily assembled into the coin handling device may be provided. By the present embodiment, a wiggling motion in the direction parallel to the rotational axis of the center shaft, and thus in the upward downward direction, may be achieved, whereby coin bridge formation is efficiently counteracted.

According to an embodiment, the tilt angle between the tilt shaft and the rotational axis of the center shaft is within the interval of 0.5° to 5°, and preferably within the interval of 1° to 3°.

An advantage with this embodiment is that with a relatively small tilt angle of the tilt shaft bridge formation may be efficiently counteracted, without moving the coin interacting surface, possibly together with coins, long distances. Moving the coin interacting surface long distances would require more driving power and the arrangement would take up more space in the volume of the coin handling device.

According to an embodiment, the bridge-counteracting arrangement further comprises an excentric shaft comprising a first end and a second end, wherein the first end of the excentric shaft is fixedly coupled to the distal end of the center shaft such that a rotational axis of the excentric shaft is radially off-set from the rotational axis of the center shaft, and wherein the second end of the excentric shaft is rotatably coupled to the bridge-breaking element.

By the present arrangement, a wiggling motion may be achieved for at least some points on the coin interacting surface, comprising movement with alternating direction perpendicular to the rotational axis of the center shaft, during the course of rotational motion of the center shaft. The motion causes a slight stirring effect without the need for pushing a larger stirring arm through the mass of coins.

An advantage with this embodiment is that a bridge-counteracting arrangement that may be easily assembled into the coin handling device may be provided. By the present embodiment, a wiggling motion in the direction perpendicular to the rotational axis of the center shaft, and thus in the side-to-side direction, may be achieved, whereby coin bridge formation is efficiently counteracted.

According to an embodiment, the rotational axis of the excentric shaft is further arranged to be parallel with the rotational axis of the center shaft.

According to an embodiment, the rotational axis of the excentric shaft is further arranged to form an angle with the rotational axis of the center shaft.

By the embodiment with a tilted excentric shaft, a wiggling motion in directions both perpendicular to and parallel with the rotational axis of the center shaft is achieved.

According to a second aspect, there is provided a coin handling machine comprising a plurality of coin dispensers and a coin sorting device for sorting coins by denomination into the plurality of coin dispensers such that each coin dispenser is configured to receive and store a particular denomination of coins, wherein at least one of the plurality of coin dispensers comprises a coin handling device according to any of the preceding claims.

Effects and features of the second aspect are largely analogous to those described above in connection with the first aspect. Embodiments mentioned in relation to the first aspect are largely compatible with the second aspect.

Since the coin denomination to be received by each of the plurality of coin dispensers is pre-determined and known, counteraction of coin bridge formation may be adapted for each coin dispenser respectively. Some coin denominations may require a bridge-counteracting arrangement as disclosed herein. Other coin denominations may require other jam preventing measures. Hence, by the present arrangement, a coin handling machine may be provided, in which improved effect of the coin jam preventing measures may be achieved.

According to a third aspect, there is provided a method for counteraction of coin bridge formation in a coin handling device comprising a coin container defining a volume and holding a mass of coins input to the coin container in the volume, and a coin output arrangement located at a lower end of the volume, said coin output arrangement being configured to output one or more coins of the mass of coins from the coin container at a bottom of the volume, wherein the coin handling device is configured to be arranged in an orientation for use such that coins will be pulled towards the bottom of the volume by the gravitational field; the method comprising:

performing, by a center shaft protruding from the bottom of the volume, into the volume, a rotational motion around a rotational axis of the center shaft;

converting the rotational motion of the center shaft to a wiggling motion of a coin interacting surface of a bridge-breaking element coupled to a distal end of the center shaft with respect to the bottom of the volume, whereby coin bridge formation is counteracted.

An advantage with the method is that coin bridge formation may be counteracted. Thus, interruptions in the operation of the coin handling machine may be avoided. By using the method in a coin handling device, a coin handling machine that does not require frequent supervision and/or interference by trained personnel may be provided. Thus, the machine becomes more reliable, efficient, and cheaper to operate.

Effects and features of the second and third aspects are largely analogous to those described above in connection with the first aspect. Embodiments mentioned in relation to the first aspect are largely compatible with the second and third aspects. It is further noted that the inventive concepts relate to all possible combinations of features unless explicitly stated otherwise.

Other objectives, features and advantages of the present inventive concept will appear from the following detailed disclosure, from the attached claims as well as from the drawings.

BRIEF DESCRIPTIONS OF THE DRAWINGS

The above, as well as additional objects, features, and advantages of the present inventive concept, will be better understood through the following illustrative and non-limiting detailed description, with reference to the appended drawings. In the drawings like reference numerals will be used for like elements unless stated otherwise.

DETAILED DESCRIPTION

In cooperation with attached drawings, the technical contents and detailed description of the present inventive concept are described hereinafter according to a preferable embodiment, being not used to limit the claimed scope. This inventive concept may be embodied in many different forms and should not be construed as limited to the embodiments set forth herein; rather, these embodiments are provided for thoroughness and completeness, and fully convey the scope of the inventive concept to the skilled person.

Figure 1:
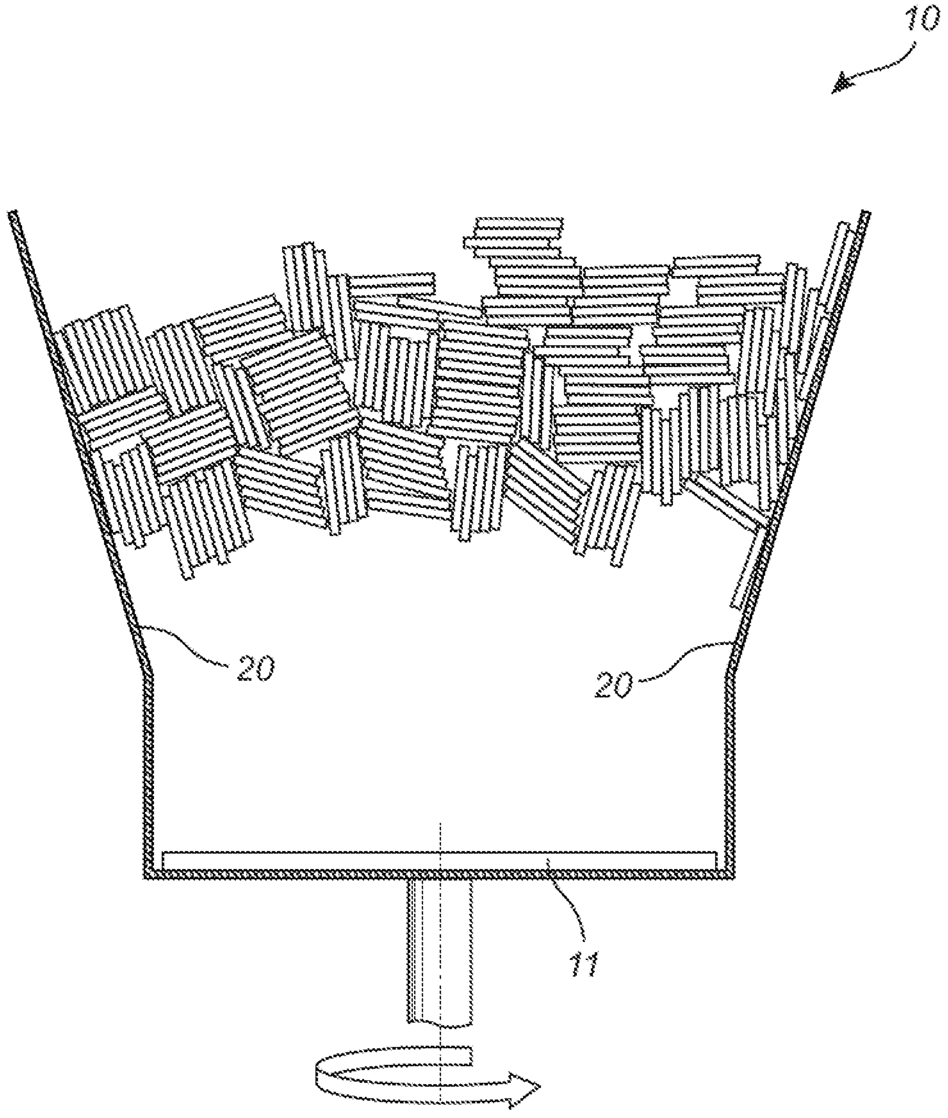
FIG. 1 illustrates the phenomenon of coin bridge formation.

FIG. 1 illustrates the phenomenon of coin bridge formation. Coin bridge formation may be described as several coins being arranged in positions in which they together form a bridge, interconnecting stationary surfaces 20 of the coin container.

Such coin bridges may be formed in conventional coin dispensers, whereby the coins in the bridge may be prevented from reaching the coin output mechanism, in the present example presented in the form of a rotatable disk 11 of the dispenser 10. A coin bridge may further form an obstacle for other coins, and as such the coin bridge may prevent other coins, not being part of the coin bridge, from reaching the rotatable disk 11. Consequently, the coins cannot be output from the coin dispenser 10.

Coin bridge formation is one example of coin jam that may occur inside a coin dispenser 10. Coin bridge formation does not necessarily interrupt the function of the coin dispenser 10, e.g. such that the movement of a rotatable disk 11 is prevented, which may require that the coin dispenser 10 needs to be shut down and reset. Rather, coin bridge formation may reduce efficiency of the normal operation of the coin dispenser 10. For example, if the coin dispenser 10 is not able to output any coins, the control system of the coin handling machine in which the coin dispenser 10 is arranged, may interpret this as the coin dispenser 10 being empty even when this is not the case.

Coin bridge formation may thus cause unexpected results of a coin dispensing action such that no coins or fewer coins than expected are output from the coin dispenser 10. This may lead to a miscount of coins being output, which is a severe error of a coin handling machine.

Figure 2:
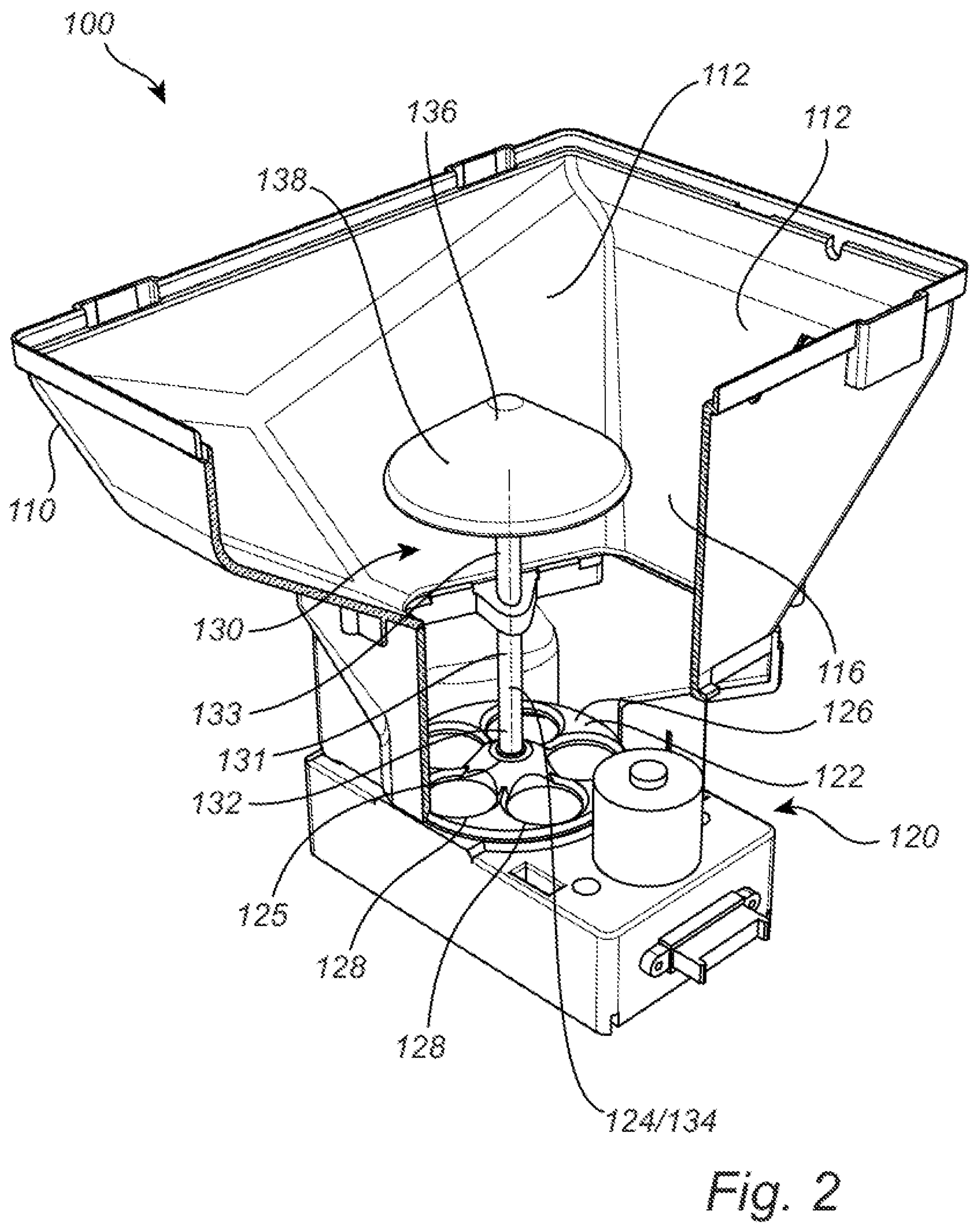
FIG. 2 illustrates a coin handling device for a coin handling machine.

FIG. 2 illustrates a coin handling device 100 for a coin handling machine, according to an embodiment.

The coin handling device 100 comprises a coin container 110 configured to define a volume 116 and to hold a mass of coins input to the coin container 110 in the volume 116. Inner walls 112 of the coin container 110 are part of defining the volume 116. However, it should be understood that although the volume 116 may be defined solely by the inner walls 112 of the coin container 110, the volume 116 may alternatively be defined by the inner walls 112 of the coin container 116 in combination with one or more other features of the coin handling device 100.

The coin handling device 100 further comprises a coin output arrangement 120 arranged at a lower end of the coin container 110. The coin output arrangement 120 comprises a rotatable disk 122 located at a bottom of the volume 116. The rotatable disk 122 is arranged to rotate in the coin output arrangement 120, around the rotational axis 124 of the rotatable disk 122. The coin handling device 100 is configured to be arranged in an orientation for use, as illustrated in FIG. 2, such that coins will be pulled towards the bottom of the volume 116 by the gravitational field. By the present arrangement, the rotatable disk 122 is arranged at the bottom of the volume 116.

The rotatable disk 122 includes five coin engaging elements 128, defined on a coin facing surface 126 of the rotatable disk 122. It should be understood that in other embodiments the rotatable disk 122 may comprise a different number of coin engaging elements 128. By way of example, the number of coin engaging elements 128 may be one, two, three, four, six or any other suitable number.

Each of the five coin engaging elements 128 are configured to engage an individual coin of the mass of coins in the volume 116. In the present embodiment, each of the coin engaging elements 128 are defined by walls surrounding a through-opening formed in the rotatable disk 122. Each through-opening is circularly shaped and have a diameter corresponding to the diameter of the individual coin, allowing the individual coin to pass through the rotatable disk 122. The individual coin is supported by a support plate (not shown in the illustration) from below. By the present arrangement, the individual coin can move with the rotatable disk 122 along a circular path within the plane of the rotatable disk 122, as the rotatable disk 122 rotates around the rotational axis 124. By the rotation of the rotatable disk 122, the individual coin is moved to a position located along the circular path, at which position the individual coin is dispensed from the rotatable disk 122, allowing said individual coin to be output from the coin container 110.

It should be understood that, although the coin engaging elements 128 are realized as through-openings in the present embodiment, coin engaging elements 128 may be realized in other ways, such as by indentations, recesses, or protrusions of the rotatable disk 122. In the present example, the coin output arrangement 120 comprises a rotatable disk 122 for outputting coins from the coin handling device 100. However, it is conceivable that alternative coin output mechanisms may be used, such as e.g. conveyor belts.

Further, the coin handling device 100 comprises a bridge-counteracting arrangement 130 configured to counteract coin bridge formation in the volume 116.

The bridge-counteracting arrangement 130 comprises a center shaft 131 protruding from the bottom of the volume 116, into the volume 116. In the present embodiment, the center shaft thus protrudes in a direction perpendicular to the coin facing surface 126. The center shaft 131 comprises a proximal end 132 and a distal end 133 with respect to the bottom of the volume and thus with respect to the rotatable disk 122. At the proximal end 132 the center shaft 131 is fixedly attached to a center point 125 of the rotatable disk 122 such that a rotational axis 134 of the center shaft 131 coincides with a rotational axis 124 of the rotatable disk 122. By the present arrangement, rotation of the rotatable disk 122 will cause rotation of also the center shaft 131 around the rotational axis 134.

It is conceivable that alternative arrangements of the center shaft are possible. By way of example, the center shaft 131 may alternatively be arranged to protrude through a through-hole at the center point 125 of the rotatable disk 122, such that the center shaft 131 may freely rotate in the through-hole. In this manner, the center shaft 131 may be rotated independently of the rotatable disk 122. By way of further example, the center shaft 131 may be connected to another shaft via one or more cardan joints, wherein the other shaft may protrude through a through hole in a side wall in coin output arrangement 120 such that the center shaft 131 may be rotated independently of the rotatable disk 122.

The bridge-counteracting arrangement 130 further comprises a bridge-breaking element 136 arranged at the distal end 133 of the center shaft 131. In the present embodiment the bridge-breaking element 136 has the shape of a cone with a rounded top. However, it should be understood that the shape of the bridge-breaking element 136 is not limited to being a cone, but may alternatively have the shape of a prism, a planar sheet, or any other suitable shape. The bridge-breaking element 136 presents a coin interacting surface 138 arranged in the volume 116 and facing away from the rotatable disk 122 at the bottom of the volume 116. This means that if a large mass of coins is present in the volume 116, the coin interacting surface 138 may be facing some of the coins in the mass of coins.

The coin interacting surface 138 extends externally to a perimeter of the center shaft 131, towards, but not all the way to, the inner walls 112 of the coin container 110. The present arrangement leaves a gap between the inner walls 112 and the coin interacting surface 138 with enough space for allowing coins to pass through the gap, thus in this manner advance towards the rotatable disk 122.

The distal end 133 is coupled to the bridge-breaking element 136 so as to enable conversion of rotational motion of the center shaft 131 to a wiggling motion of the coin interacting surface 138. In this manner coin bridge formation may be efficiently counteracted. Two examples of the details of such coupling are provided in relation to the subsequent drawings.

Figure 3:
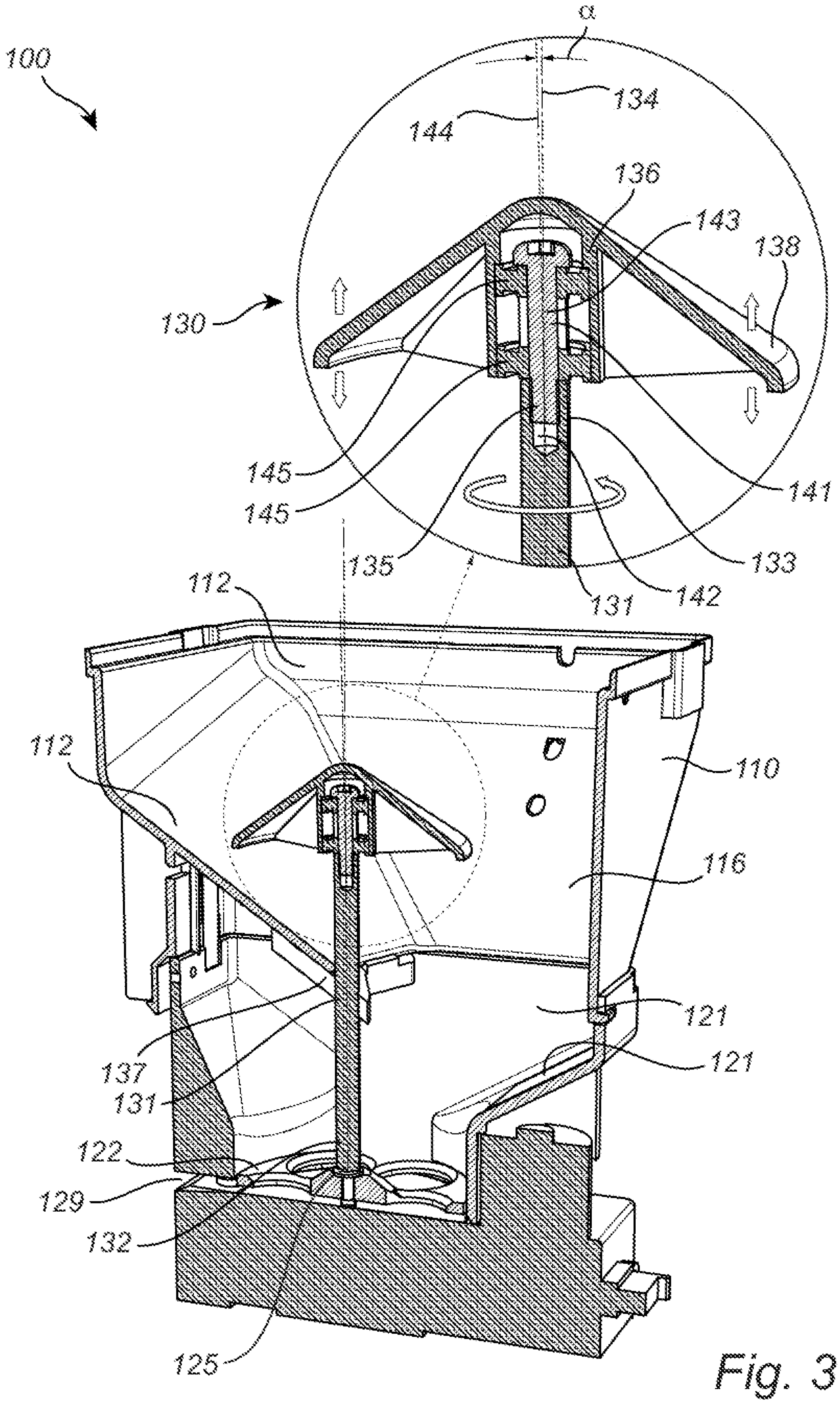
FIG. 3 illustrates a cross-sectional view of the coupling between the center shaft and the bridge-breaking element of the coin handling device.

FIG. 3 illustrates a cross-sectional view of the coupling between the center shaft 131 and the bridge-breaking element 136 of the coin handling device 100, according to an embodiment.

The bridge-counteracting arrangement 130 further comprises a tilt shaft 141, having a first end 142 and a second end 143. The first end 142 of the tilt shaft 141 is fixedly coupled to the distal end 133 of the center shaft 131. Fixation is provided by a threaded hole 135 at the distal end 133 of the center shaft 131 in combination with a threaded lateral surface at the first end 142 of the tilt shaft 141. In this manner the tilt shaft 141 effectively functions as a screw that can be tightened into the threaded hole 135.

The threaded hole 135 is arranged at an angle with respect to the rotational axis 134 of the center shaft 131. By the present arrangement a tilt angle $\alpha$ between the rotational axis 134 of the center shaft 131 and an axis 144 of the tilt shaft 141 is provided. In the present embodiment, the tilt angle $\alpha$ is 1°, however it should be understood that the tilt angle $\alpha$ may be any angle within the interval of 0.5° to 5°, and preferably within the interval of 1° to 3°. It serves to mention that much larger tilt angles than mentioned here may also be possible. However, a relatively small tilt angle $\alpha$ of the tilt shaft 141 is advantageous, because bridge formation may be efficiently counteracted, without moving the coins long distances. A large movement of an end of the tilt shaft, associated with a large tilt angle $\alpha$ may require a large force if a large mass of coins rest on the coin interacting surface 138, and would require more driving power. The arrangement may potentially also take up more space in the volume of the coin handling device.

It should be understood that although the fixation of the tilt shaft 141 to the center shaft 131 is made by threading, the inventive concept is by no means limited to threading based fixation. By way of example, fixation may alternatively be made by welding, gluing, riveting or any other suitable manner for fixation.

At the second end 143 of the tilt shaft 141 the bridge-breaking element 136 is rotatably coupled to the tilt shaft 141. In order to facilitate the rotational freedom of the bridge-breaking element 136 with respect to the tilt shaft 141, two sets of ball bearings 145 are provided therebetween. By the present arrangement, rotational motion of the center shaft 131 does not force rotational motion of the bridge-breaking element 136. This means that if a weight load is placed on the coin interacting surface 138, as for example by a mass of coins, the bridge-breaking element 136 is allowed to maintain its orientation to a large extent, despite the rotational motion of the center shaft 131. This is an advantage with the present embodiment, because forcing the bridge-breaking element 136 to rotate through the mass of coins would require considerably higher power, and it may also mean higher wear of the parts of the bridge-counteracting arrangement.

It should be understood that the number of sets of bearings 145 may be different in different embodiments. By way of example, the number of sets of bearings 145 may be one, three, or four. Some other embodiments may comprise no set of bearings 145.

As described also in relation to FIG. 2, the proximal end 132 of the center shaft 131 is fixedly attached to a center point 125 of the rotatable disk 122 in the present embodiment, such that rotation of the rotatable disk 122 will cause rotation of also the center shaft 131 around the rotational axis 134. Because of the coupling comprising a tilt shaft 141 and the sets of ball bearings 145, the bridge-breaking element 136 largely maintains its orientation, and does not follow the rotational motion of the center shaft 131. However, the rotational motion of the center shaft 131 will cause the tilt shaft 141 to circulate around the rotational axis 134 of the center shaft 131. The circulation will consequently cause the tilt angle $\alpha$ to change direction and thereby generate a wiggling motion of the bridge-breaking element 136. The wiggling motion comprises a movement of at least some points on the coin interacting surface 138, in a direction parallel to the rotational axis 134 of the center shaft 131, which in the present embodiment corresponds to a direction perpendicular to the rotatable disk 122, alternatingly towards and away from the rotatable disk 122, during the course of rotational motion of the center shaft 131. The wiggling motion of the coin interacting surface 138 will influence coins present in the vicinity of the coin interacting surface 138 such that coin bridge formation may be counteracted. It should be noted that although the wiggling motion is said to comprise movement in a direction perpendicular to the rotatable disk 122, it by no means exclude movements also in other directions than the direction perpendicular to the rotatable disk 122.

In order to provide higher mechanical stability, which may be especially important in situations when a large mass of coins is present in the volume 116, the coin handling device 100 in the present embodiment comprises a support element 137, which is arranged to support the center shaft 131. The support element 137 is attached to the coin container 110, whereby the support element 137 is stationary in the volume 116 and may thus ensure that the center shaft 131 does not deviate from the rotational axis 124 of the rotatable disk 122.

As is illustrated in FIG. 3, the coin interacting surface 138 has an inclination with respect to a plane to which the rotational axis 134 of the center shaft 131 extends perpendicularly, from the distal end 133 towards the bottom of the volume 116. In the present embodiment, such a plane is the plane of the rotatable disk 122. When the coin handling device 100 is in the orientation for use, the rotatable disk 122 has a horizontal orientation meaning that the rotatable disk 122 is arranged perpendicular to Earth's gravitational field. Thus the inclination of the coin interacting surface 138 ensures that any coins coming from above in the coin container 110 and reaching the coin interacting surface 138 will slide off of the coin interacting surface 138 and continue downwards in the volume towards the rotatable disk 122. In the present embodiment, the inclination angle between the coin interacting surface 138 and the plane of rotatable disk 122 varies between 30° and 40° during the course of the wiggling motion, depending on the position of the tilt shaft 141. However, the inclination angle is by no means limited to fall within this interval. It is conceivable that also other inclination angles may be used. By way of example, suitable inclination angles between the coin interacting surface 138 and the rotatable disk 122 may be within the interval of 10° to 70°, and preferably within the interval of 15° to 50°.

FIG. 3 further illustrates that, in the present embodiment, the volume 116 is defined by the coin container 110 and the coin output arrangement 120 in combination. The coin output arrangement 120 comprises inner walls 121 at an upper part of the coin output arrangement 120, and the inner walls 121 connect to the inner walls 112 of the coin container 110 such that the inner walls 112 of the coin container 110 and the inner walls 121 of the coin output arrangement 20 together define the volume 116.

Coins of the mass of coins in the coin container 110 may therefore travel by the pull of gravity, from the coin container 110 along the walls 121 of the coin output arrangement 120 to reach the rotatable disk 122. The rotatable disk 122 may then engage coins individually and transport them to a coin output 129.

In the present embodiment, coins are output through a coin output 129 at a side of the coin output arrangement 120. It is conceivable that also other output directions are possible. By way of example, the coin may be output by falling downwards if reaching a coin output located below the coin during the coin's travel along the circular path of the rotatable disk 122.

Figure 4:
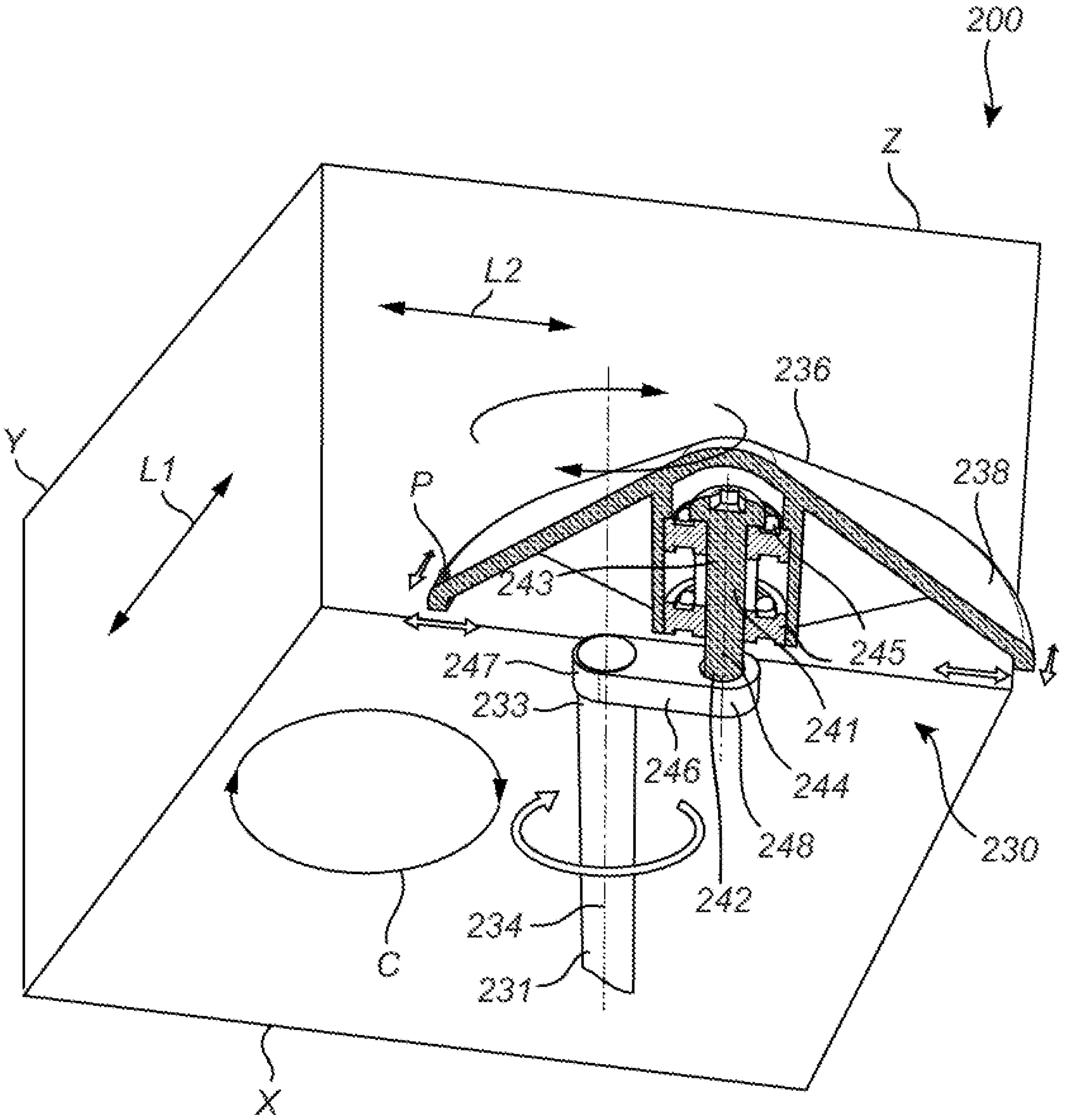
FIG. 4 illustrates a cross-sectional view of the coupling between the center shaft and the bridge-breaking element of the coin handling device.

FIG. 4 illustrates a cross-sectional view of the coupling between the center shaft 231 and the bridge-breaking element 236 of the coin handling device 200, according to an embodiment.

The coin handling device 200 shares a number of features with the coin handling device 100, with respect to the coin container 210 and the coin output arrangement 220, the details of which will not be repeated here. However, the coin handling device 200 differs from coin handling device 100 with respect to the bridge-counteracting arrangement 230, and the coupling between the center shaft 231 and the bridge-breaking element 236. This will be described below.

The bridge-counteracting arrangement 230 further comprises an excentric shaft 241, having a first end 242 and a second end 243. The first end 242 of the excentric shaft 241 is fixedly coupled to the distal end 233 of the center shaft 231 via a connection element 246 arranged therebetween. The connection element 246 comprises an inner end 247 and an outer end 248. The inner end 247 is fixedly coupled to the distal end 233 of the center shaft 231, such that the connection element 246 extends radially out from the distal end 233 with respect to the rotational axis 234. The outer end 248 of the connection element 246 is fixedly coupled to the first end 242 of the excentric shaft 241.

Fixation is provided by screws tightened in threaded holes in the respective shafts 231, 241. However, it should be understood that the inventive concept is by no means limited to threading based fixation. By way of example, fixation may alternatively be made by welding, gluing, riveting or any other suitable manner for fixation.

In the present embodiment, the excentric shaft 241 is arranged in parallel with the center shaft 231, such that a rotational axis 244 of the excentric shaft 241 is radially off-set from the rotational axis 234 of the center shaft 231. However, in alternative embodiments it is conceivable that the excentric shaft 241 may be coupled to the connection element 246 and arranged at an angle with respect to the center shaft 231 similarly to the angled arrangement of the tilt shaft to the center shaft as has been described in relation to FIG. 3.

At the second end 243 of the excentric shaft 241 the bridge-breaking element 236 is rotatably coupled to the excentric shaft 241. Two sets of ball bearings 245 facilitate the rotational freedom of the bridge-breaking element 236 with respect to the excentric shaft 241. By the present arrangement, rotational motion of the center shaft 231 does not force rotational motion of the bridge-breaking element 236, meaning that the bridge-breaking element 236 is allowed to maintain its orientation to a large extent, despite the rotational motion of the center shaft 231.

The proximal end (not shown in FIG. 4) of the center shaft 231 is fixedly attached to a center point (not shown in FIG. 4) of the rotatable disk (not shown in FIG. 4) such that rotation of the rotatable disk will cause rotation of also the center shaft 231 around the rotational axis 234.

Upon rotation of the center shaft 231, the excentric shaft 241 is moved in a circular path around the central shaft 231. The bridge-breaking element 236 will consequently follow the excentric shaft 241 along the circular path. However, because of the coupling comprising an excentric shaft 241 and the sets of ball bearings 245, the bridge-breaking element 236 is allowed to maintain its orientation, and is thus not forced to follow the rotational motion, for example if a mass of coins in the volume (not shown in FIG. 4) exerts a weight load on the coin interacting surface 238. Hence, the bridge-breaking element 236, and thus the coin interacting surface 238, is allowed to undergo a translational motion along a circular path around the rotational axis 234 of the center shaft 231, in a plane perpendicular to the rotational axis 234 of the center shaft 231 and thus parallel to the rotatable disk. It should be noted that a translational motion along a circular path is not a rotational motion. In this manner, a wiggling motion of a relatively large surface, i.e. the coin interacting surface 238, is achieved without moving any point on the surface a large distance through the mass of coins, as would have been the case if the bridge-breaking element 236 would rotate. Thus, an advantage is that the wiggling motion for the bridge-counteracting arrangement 230 may be transmitted with only moderate power. In this manner, less electrical power is required for driving the bridge-counteracting arrangement 236.

For the points on the coin interacting surface 238, a planar projection of the point movement, projected onto a plane parallel with the rotational axis 234 of the center shaft 231, is a wiggling motion. As illustrated in FIG. 4, plane X is perpendicular to the rotational axis 234 of the center shaft 231, and planes Y and Z are perpendicular to plane X as well as to each other. For example, point P on the coin interacting surface 238 undergoes a circular motion as the center shaft 231 rotates. The projection of the circular motion of point P onto plane X follows circle C. The projection of the circular motion of point P onto plane Y follows line L1, going back and forth. The projection of the circular motion of point P onto plane Z follows the line L2, going back and forth. Thus, for the present embodiment, planar projection of point movement onto any two perpendicular planes also parallel with the rotational axis 234 of the center shaft 231, is a wiggling motion with movement of alternating direction in planes perpendicular to the rotational axis 234 of the center shaft 231 and thus parallel to the rotatable disk, during the course of rotational motion of the center shaft 231.

The wiggling motion of the coin interacting surface 238 will influence coins present in the vicinity of the coin interacting surface 238 such that coin bridge formation may be counteracted. It should be noted that although the wiggling motion is said to comprise movement in a direction perpendicular to the rotatable disk, it by no means excludes movements also in other directions than the direction perpendicular to the rotatable disk.

Figure 5:
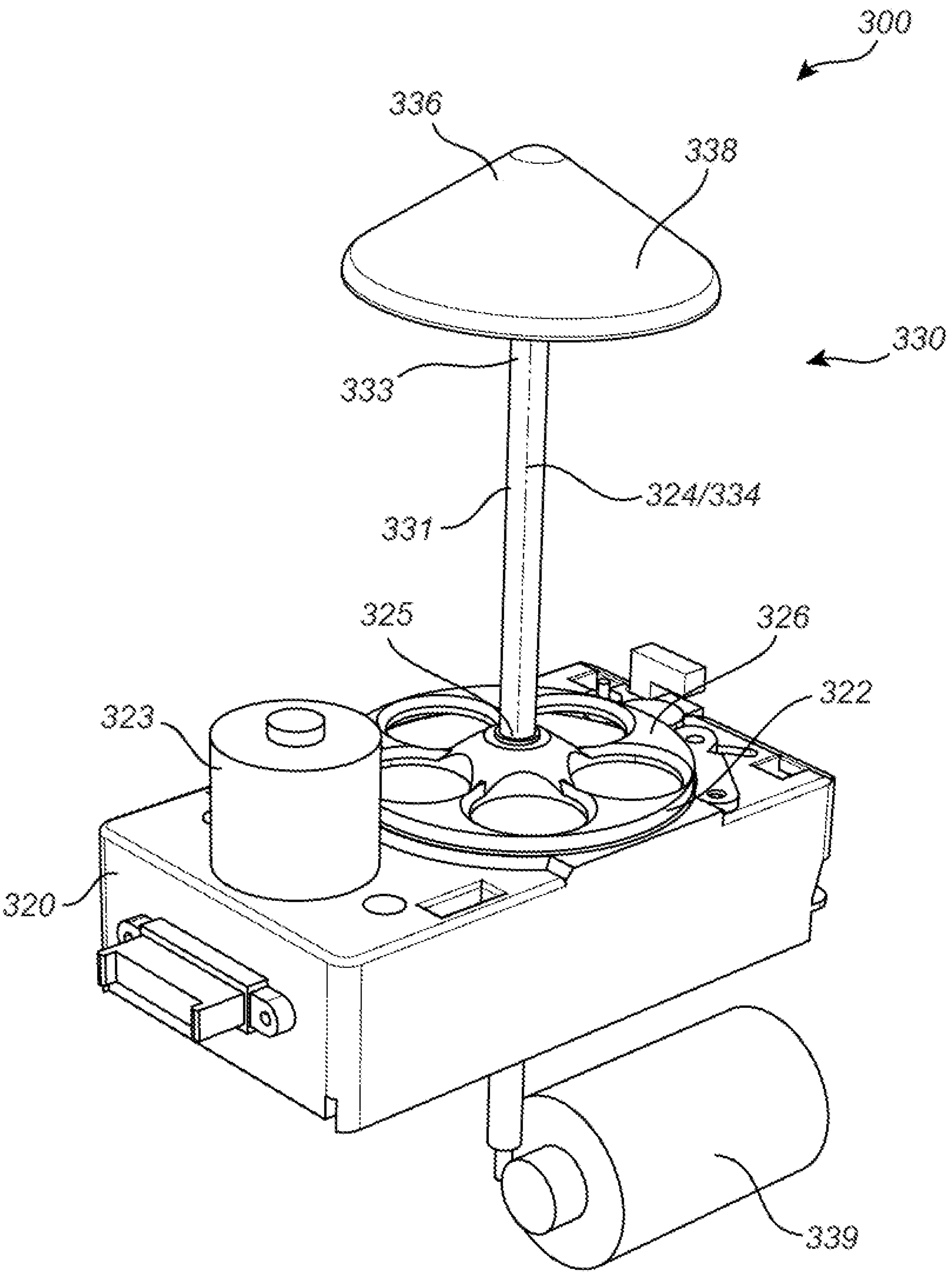
FIG. 5 illustrates parts of a coin handling device for a coin handling machine.

FIG. 5 illustrates parts of a coin handling device 300 for a coin handling machine, according to an embodiment.

The coin handling device 300 shares a number of features with the coin handling devices 100, 200, with respect to the coin container 210 and the coin output arrangement 220, the details of which will not be repeated here. However, the coin handling device 300 differs from coin handling devices 100, 200 with respect to the driving mechanism of the center shaft 331. This will be described below.

The coin handling device 300 comprises a coin output arrangement 320 with a rotatable disk 322 located at a bottom of the volume 316. The rotatable disk 322 is arranged to rotate in the coin output arrangement 320, around the rotational axis 324 of the rotatable disk 322. Rotation of the rotatable disk 322 is generated by a first rotation generating unit 323, which in the present embodiment is an electrical motor.

Further, the coin handling device 300 comprises a bridge-counteracting arrangement 330 configured to counteract coin bridge formation in the volume 316.

The bridge-counteracting arrangement 330 comprises a center shaft 331 protruding from the bottom of the volume (not shown in FIG. 5) in a direction perpendicular to the coin facing surface 326, into the volume 316. The bridge-counteracting arrangement 330 further comprises a bridge-breaking element 336 arranged at a distal end 333 of the center shaft 331.

The center shaft 331 is arranged through a through-hole at the center point 325 of the rotatable disk 322 such that the center shaft may freely rotate in the through-hole at the center point 325. The center shaft 331 is further arranged such that a rotational axis 334 of the center shaft 331 coincides with a rotational axis 324 of the rotatable disk 322. At the end of the center shaft 331 located outside the volume 316, and thus below the rotatable disk 322, the center shaft 331 is coupled to a second rotation generating unit 339, which in the present embodiment is a second electrical motor, providing rotational motion to the center shaft 331. Since the first rotation generating unit 232 and the second rotation generating unit 339 are two separate units which can be operated independently, also the rotational motion of the rotatable disk 322 and the rotational motion of the center shaft 331 are independent of each other. In the manner described above, a coin handling device 300 with a more flexible bridge-counteracting arrangement 330 may be provided, in that the center shaft 331 may optionally be set to follow a different angular velocity than the rotatable disk 322, or to follow the same angular velocity as the rotatable disk 322. Moreover, the center shaft 331 may optionally be set to rotate while the rotatable disk 322 is stopped, and vice versa.

It should be understood that the feature of independently rotatable disk 322 and center shaft 331 of coin handling device 300 may also optionally be incorporated into the previously discussed coin handling devices 100, 200.

Figure 6:
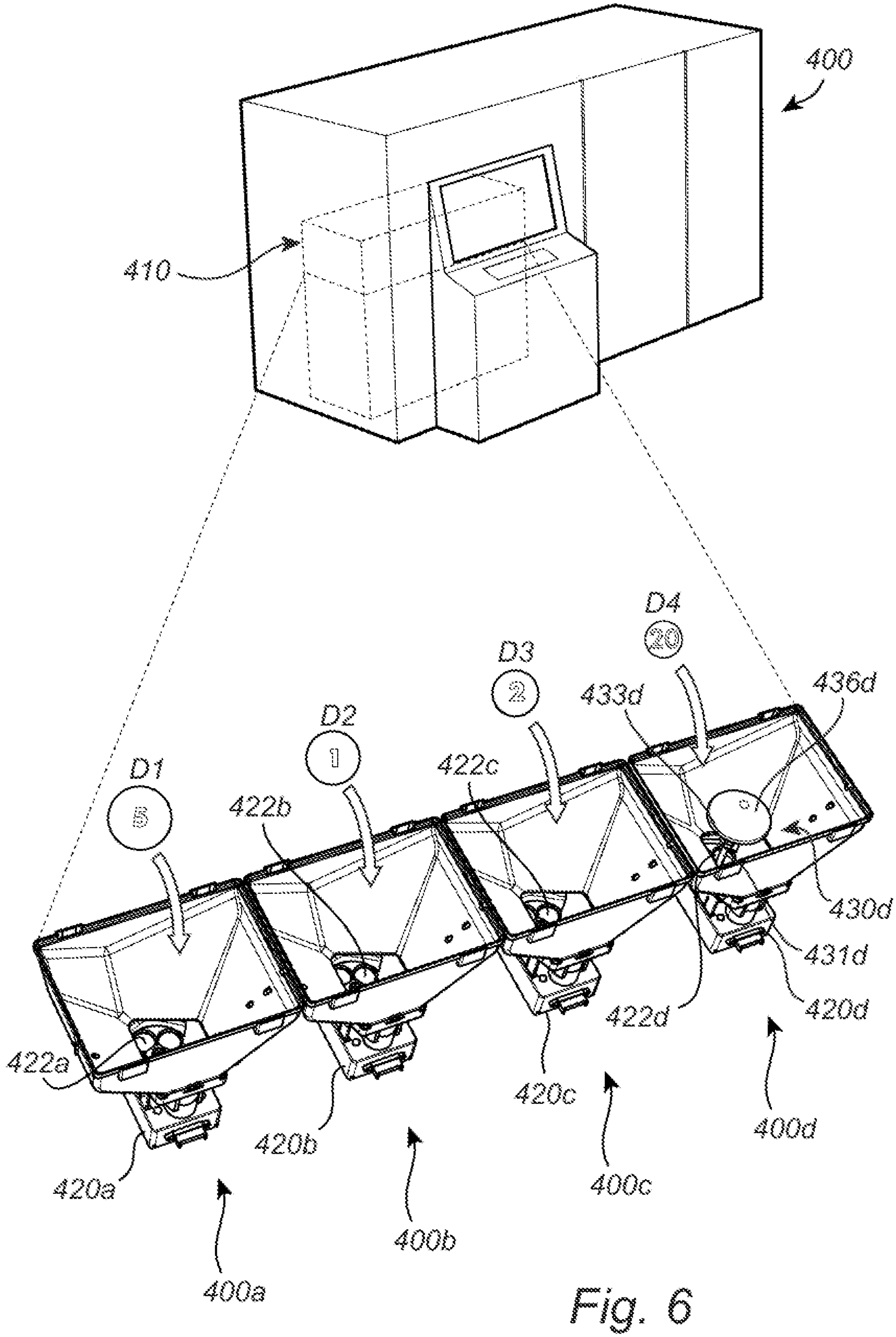
FIG. 6 illustrates a coin handling machine comprising a plurality of coin dispensers, one of which comprises a coin handling device.

FIG. 6 illustrates a coin handling machine 400 comprising a plurality of coin dispensers 400*a-d*, one of which comprises a coin handling device, according to an embodiment.

The coin handling machine 400 comprises a coin sorting device 410 configured for sorting coins by denomination into the plurality of coin dispensers 400*a-d*.

The coin handling machine 400 further comprises four separate coin dispensers 400*a-d*, each of which is configured to receive and store an associated coin denomination D1-D4, which coin denominations are all mutually different from each other. The coin dispensers 400*a-d* comprise coin output arrangements 420*a-d* with rotatable disks 422*a-d*.

The coin dispenser 400*d* comprises a bridge-counteracting arrangement 430*d* with a center shaft 431*d* at the distal end 433*d* of which a bridge-breaking element 436*d* is coupled. Such a bridge-counteracting arrangement 430*d* is suitable for counteracting coin bridge formation of coin denomination D4.

The other three coin dispensers 400*a-c* do not comprise any bridge-counteracting arrangement, but may comprise other arrangements for prevention of other types of coin jams. The reason for using different arrangements is that the coins of denominations D1-D4 have different physical properties. The different physical properties of the coins make their respective coin bridge formation or coin jamming abilities different. Also, some denominations may be less prone to coin bridge formation, and for such coin denominations bridge-counteracting arrangements may not always be required.

It serves to mention that the coin handling machine 400 is merely an example embodiment. It is conceivable that a coin handling machine may comprise fewer or more dispensers. It is further conceivable that all dispensers in a coin handling machine may have the same type of bridge-counteracting arrangement, or that some dispensers may have one type of bridge-counteracting arrangement, and that the other dispensers may have different or no bridge-counteracting arrangements.

Figure 7:
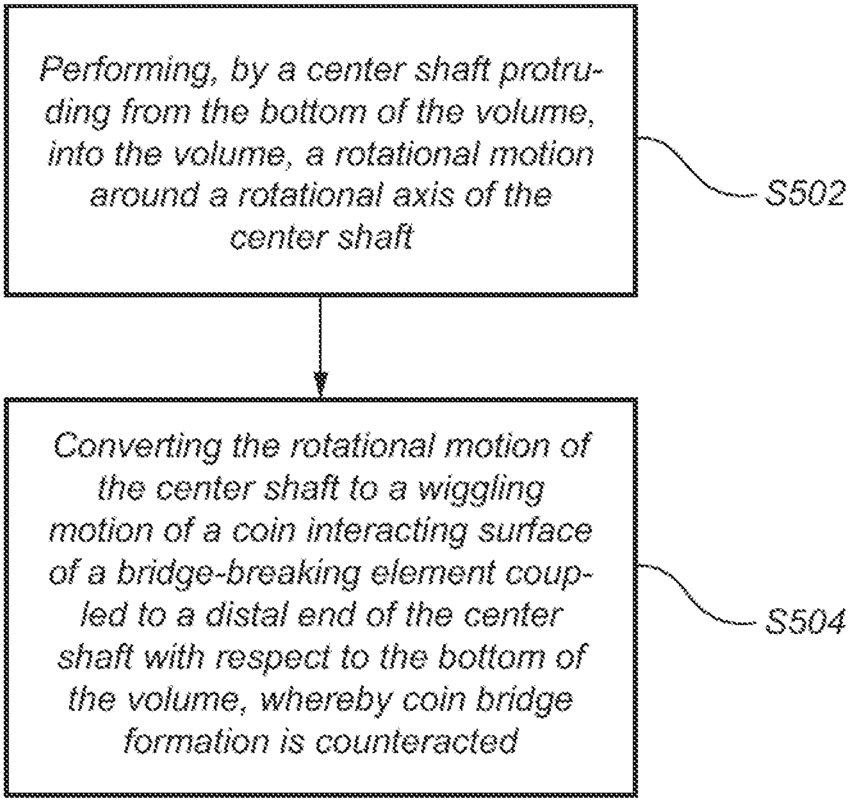
FIG. 7 illustrates a schematic block diagram shortly summarizing the method for counteraction of coin bridge formation in a coin handling device.

FIG. 7 illustrates a schematic block diagram shortly summarizing the method for counteraction of coin bridge formation in a coin handling device, as previously described in relation to the operation of the coin handling device 100, 200, 300, 400*d*. It should be understood that the steps of the method, although listed in a specific order herein, may be performed in any order suitable.

The method is intended for counteraction of coin bridge formation in a coin handling device comprising a coin container defining a volume and holding a mass of coins input to the coin container in the volume. The coin handling machine further comprises a coin output arrangement located at a lower end of the volume. The coin output arrangement is configured to output one or more coins of the mass of coins from the coin container at a bottom of the volume. The coin handling device is configured to be arranged in an orientation for use such that coins will be pulled towards the bottom of the volume by the gravitational field.

The method may comprise performing S502, by a center shaft protruding from the bottom of the volume, into the volume, a rotational motion around a rotational axis of the center shaft. It should be understood that there may be implementations of the methods in which the performing S502 a rotational motion of the center shaft may be linked to the rotational motion of a rotatable disk. It should be understood that there may be implementations of the methods in which the performing S502 a rotational motion of the center shaft may be independent of a rotational motion of the rotatable disk.

The method may further comprise converting S504 the rotational motion of the center shaft to a wiggling motion of a coin interacting surface of a bridge-breaking element coupled to a distal end of the center shaft with respect to the bottom of the volume, whereby coin bridge formation is counteracted. It should be understood that there may be implementations of the methods in which the converting S504 the rotational motion to a wiggling motion may involve a wiggling motion comprising a movement of at least some points on the coin interacting surface, in a direction parallel to the rotational axis of the center shaft, alternatingly towards and away from the bottom of the volume, during the course of rotational motion of the center shaft. It should be understood that there may be implementations of the methods in which the converting S504 the rotational motion to a wiggling motion may involve a wiggling motion comprising, for at least some points on the coin interacting surface, movement with alternating directions perpendicular to the rotational axis of the center shaft, during the course of rotational motion of the center shaft.

In the above the inventive concept has mainly been described with reference to a limited number of examples. However, as is readily appreciated by a person skilled in the art, other examples than the ones disclosed above are equally possible within the scope of the inventive concept, as defined by the appended claims.

The invention claimed is:

1. A coin handling device for a coin handling machine, the coin handling device comprising:

a coin container configured to define a volume and to hold a mass of coins input to the coin container in the volume;

a coin output arrangement arranged at a lower end of the coin container, the coin output arrangement being configured to output one or more coins of the mass of coins from the coin container at a bottom of the volume, wherein the coin handling device is configured to be arranged in an orientation for use such that coins will be pulled towards the bottom of the volume by the gravitational field;

a bridge-counteracting arrangement configured to counteract coin bridge formation in the volume, the bridge-counteracting arrangement having a center shaft protruding from the bottom of the volume into the volume, the center shaft being configured to perform a rotational motion around a rotational axis of the center shaft, and a bridge-breaking element presenting a coin interacting surface arranged in the volume and facing away from the bottom of the volume, wherein the coin interacting surface extends externally to a perimeter of the center shaft, towards an inner wall defining the volume;

wherein the center shaft has a distal end with respect to the bottom of the volume, the distal end is coupled to the bridge-breaking element for enabling conversion of the rotational motion of the center shaft to a wiggling motion of the coin interacting surface, whereby coin bridge formation is counteracted;

wherein the bridge-counteracting arrangement further comprises a tilt shaft having a first end and a second end;

wherein the first end of the tilt shaft is fixedly coupled to the distal end of the center shaft such that the tilt shaft forms a tilt angle with respect to the rotational axis of the center shaft; and wherein the second end of the tilt shaft is rotatably coupled to the bridge-breaking element.

2. The coin handling device according to claim 1, wherein at least a portion of the coin interacting surface has an inclination with respect to a plane to which the rotational axis of the center shaft extends perpendicularly, from the distal end towards the bottom of the volume.

3. The coin handling device according to claim 2, wherein an inclination angle between the portion of the coin interacting surface and the plane is within the interval of 10° to 70°.

4. The coin handling device according to claim 1, wherein the wiggling motion comprises a movement of at least some points on the coin interacting surface, in a direction parallel to the rotational axis of the center shaft, alternatingly towards and away from the bottom of the volume, during the rotational motion of the center shaft.

5. The coin handling device according to claim 1, wherein the wiggling motion comprises, for at least some points on the coin interacting surface, movement with alternating directions perpendicular to the rotational axis of the center shaft, during rotational motion of the center shaft.

6. The coin handling device according to claim 1, wherein the coin output arrangement further comprises a rotatable disk located at the bottom of the volume;

wherein the rotatable disk includes one or more coin engaging elements defined on the rotatable disk on a coin facing surface thereof, each of the one or more coin engaging elements being configured to engage an individual coin of the mass of coins to allow the individual coin to be output from the coin container.

7. The coin handling device according to claim 6, wherein the center shaft is protruding in a direction perpendicular to the coin facing surface, into the volume, such that the rotational axis of the center shaft coincides with a rotational axis of the rotatable disk.

8. The coin handling device according to claim 6, wherein the center shaft is operably coupled to the rotatable disk, linking the rotational motion of the center shaft to a rotational motion of the rotatable disk.

9. The coin handling device according to claim 1, wherein the distal end is coupled to the bridge-breaking element such that rotational motion of the center shaft does not force rotational motion of the bridge-breaking element.

10. The coin handling device according to claim 1, wherein a coupling between the distal end and the bridge-breaking element comprises at least one set of bearings.

11. The coin handling device according to claim 1, wherein the tilt angle between the tilt shaft and the rotational axis of the center shaft is within the interval of 0.5° to 5°.

12. A coin handling machine comprising:

a plurality of coin dispensers; and a coin sorting device for sorting coins by denomination into the plurality of coin dispensers such that each coin dispenser is configured to receive and store a particular denomination of coins;

wherein at least one of the plurality of coin dispensers includes a coin handling device according to claim 1.

13. A coin handling device for a coin handling machine, the coin handling device comprising:

a coin container configured to define a volume and to hold a mass of coins input to the coin container in the volume;

a coin output arrangement arranged at a lower end of the coin container, the coin output arrangement being configured to output one or more coins of the mass of coins from the coin container at a bottom of the volume, wherein the coin handling device is configured to be arranged in an orientation for use such that coins will be pulled towards the bottom of the volume by the gravitational field;

a bridge-counteracting arrangement configured to counteract coin bridge formation in the volume, the bridge-counteracting arrangement having a center shaft protruding from the bottom of the volume into the volume, the center shaft being configured to perform a rotational motion around a rotational axis of the center shaft, and a bridge-breaking element presenting a coin interacting surface arranged in the volume and facing away from the bottom of the volume, wherein the coin interacting surface extends externally to a perimeter of the center shaft, towards an inner wall defining the volume;

wherein the center shaft has a distal end with respect to the bottom of the volume, the distal end is coupled to the bridge-breaking element for enabling conversion of the rotational motion of the center shaft to a wiggling motion of the coin interacting surface, whereby coin bridge formation is counteracted;

wherein the bridge-counteracting arrangement further comprises an excentric shaft having a first end and a second end;

wherein the first end of the excentric shaft is fixedly coupled to the distal end of the center shaft such that a rotational axis of the excentric shaft is radially off-set from the rotational axis of the center shaft; and wherein the second end of the excentric shaft is rotatably coupled to the bridge-breaking element.

14. A coin handling machine comprising:

a plurality of coin dispensers; and a coin sorting device for sorting coins by denomination into the plurality of coin dispensers such that each coin dispenser is configured to receive and store a particular denomination of coins;

wherein at least one of the plurality of coin dispensers includes a coin handling device according to claim 13.

* * * * *